(12) United States Patent
Lee

(10) Patent No.: US 8,720,861 B2
(45) Date of Patent: May 13, 2014

(54) PEDAL PUMPER TOOL

(76) Inventor: Tony Alan Lee, Springfield, MO (US)

(*) Notice: Subject to any disclaimer, the term of this patent is extended or adjusted under 35 U.S.C. 154(b) by 58 days.

(21) Appl. No.: 13/357,365

(22) Filed: Jan. 24, 2012

(65) Prior Publication Data
US 2012/0187358 A1 Jul. 26, 2012

Related U.S. Application Data

(60) Provisional application No. 61/435,655, filed on Jan. 24, 2011.

(51) Int. Cl.
B60S 9/10 (2006.01)
B66F 3/24 (2006.01)
B60K 1/00 (2006.01)
B60T 17/00 (2006.01)

(52) U.S. Cl.
USPC .................................. 254/93 VA; 180/65.51

(58) Field of Classification Search
USPC ....................... 254/93 VA; 180/65.5
See application file for complete search history.

(56) References Cited

U.S. PATENT DOCUMENTS

| 1,790,851 | A | | 2/1931 | Weaver | |
|---|---|---|---|---|---|
| 2,611,387 | A | * | 9/1952 | Legerski | 137/270 |
| 2,662,728 | A | * | 12/1953 | Hanes et al. | 254/119 |
| 2,866,356 | A | * | 12/1958 | Elam | 74/532 |
| 3,570,634 | A | * | 3/1971 | Yamamoto | 188/352 |
| 3,877,318 | A | * | 4/1975 | Castoe | 74/481 |
| 4,942,746 | A | * | 7/1990 | Monroy | 70/238 |
| 5,012,689 | A | * | 5/1991 | Smith | 74/89.17 |
| 5,031,729 | A | * | 7/1991 | Wittkop et al. | 188/3 H |
| 5,213,396 | A | * | 5/1993 | Avery et al. | 303/7 |
| 5,299,668 | A | * | 4/1994 | Youngers et al. | 188/352 |
| 5,411,321 | A | * | 5/1995 | Harness | 303/7 |
| 5,503,468 | A | * | 4/1996 | Saffran | 303/7 |
| 5,626,402 | A | * | 5/1997 | Saffran | 303/7 |
| 5,746,486 | A | * | 5/1998 | Paul et al. | 303/146 |
| 5,816,281 | A | * | 10/1998 | Mixon | 137/14 |
| 5,991,672 | A | * | 11/1999 | Rendi et al. | 701/71 |
| 6,131,712 | A | * | 10/2000 | Rhodenizer | 188/352 |
| 6,152,544 | A | * | 11/2000 | Greaves, Jr. | 303/7 |
| 6,325,469 | B1 | * | 12/2001 | Carson et al. | 303/140 |
| 6,634,466 | B1 | * | 10/2003 | Brock et al. | 188/3 R |
| 7,152,636 | B2 | * | 12/2006 | Petty | 141/65 |
| 7,195,096 | B1 | * | 3/2007 | Mawhinney | 180/315 |

* cited by examiner

Primary Examiner — Lee D Wilson
Assistant Examiner — Alvin Grant

(57) ABSTRACT

A tool for pumping the brake pedal of a vehicle does not require a person in the vehicle to pump the brakes. The tool permits a person to bleed the hydraulics when doing a brake job without the need for a second person. The tool, also referred to as a pedal pumper, or a pedal pumping device, may include straps on each end for extending the tool between the steering wheel and the brake pedal. When air is supplied to the tool, the air pressure may cause the tool to extend and depress the brake pedal. When the air pressure is released, the force of the tool is released and the brake pedal is allowed to return to its un-depressed position.

11 Claims, 3 Drawing Sheets

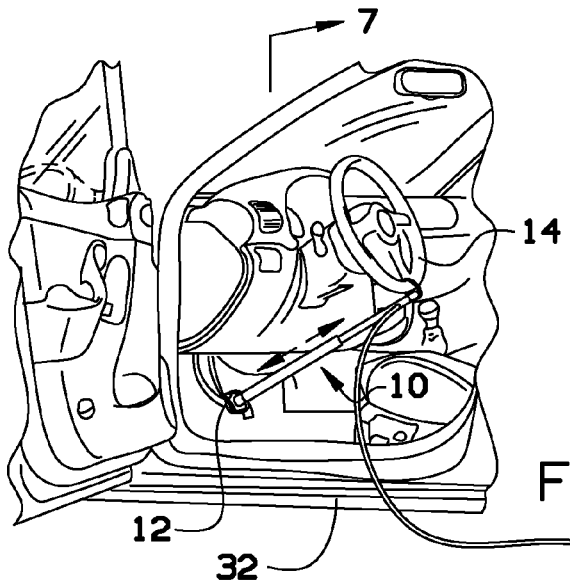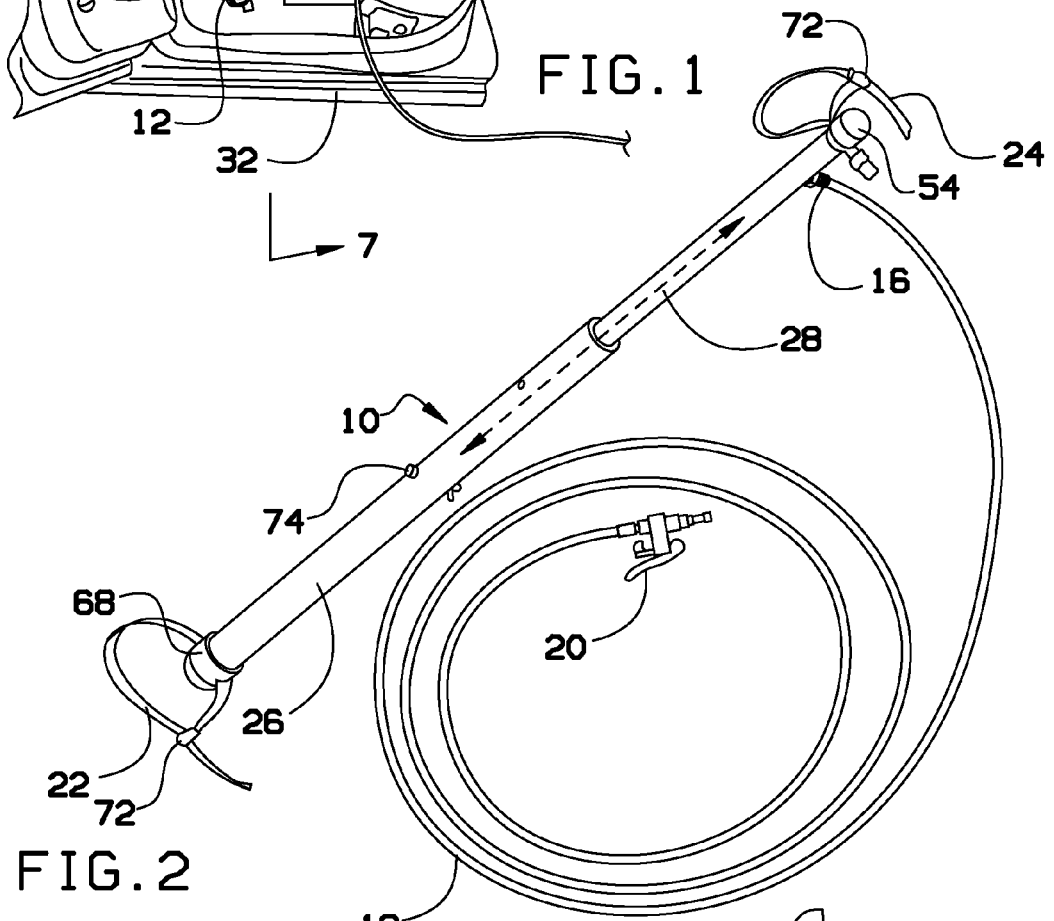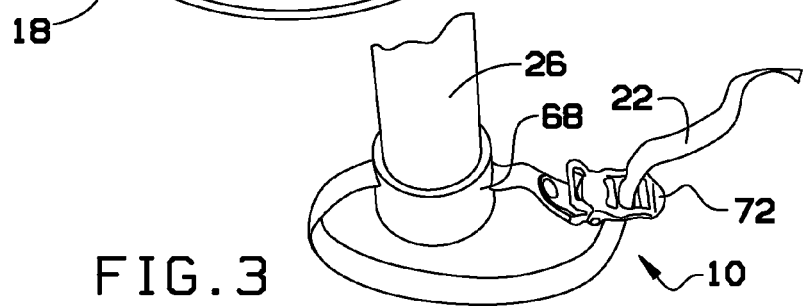

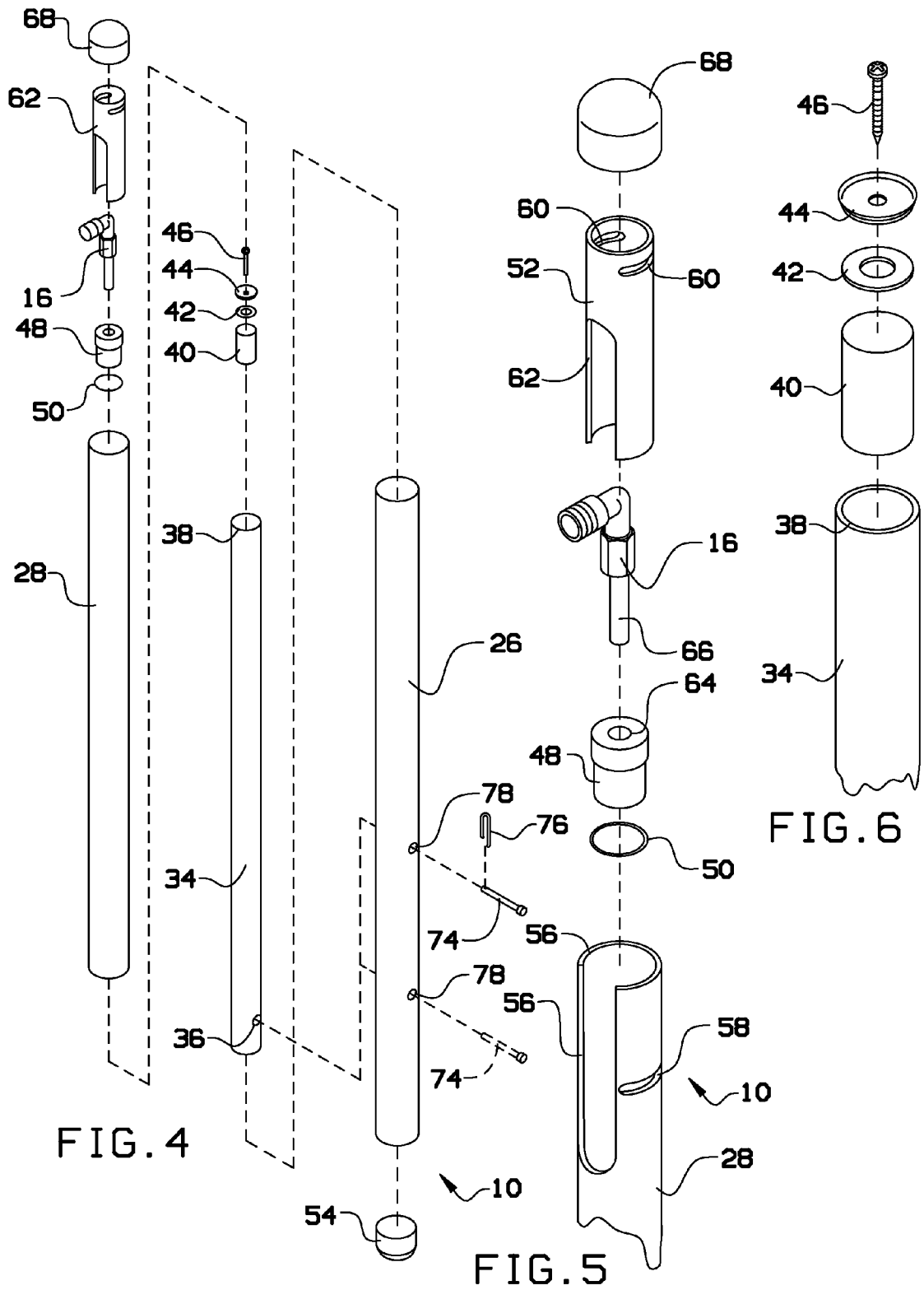

PEDAL PUMPER TOOL

CROSS-REFERENCE TO RELATED APPLICATIONS

This application claims the benefit of priority of U.S. provisional patent application No. 61/435,655, filed Jan. 24, 2011, the content of which are herein incorporated by reference.

BACKGROUND OF THE INVENTION

The present invention relates to automotive tools and, more particularly, to a tool to assist with one person bleeding of brake lines on a vehicle.

Bleeding brake lines usually requires more than one person—one person to open and close the bleeder while another person pumps the brake pedal. While devices have been developed, such as pressure bleeders, vacuum bleeders and reverse injection bleeders, these devices each have their benefits and drawbacks. However, the preferred method for bleeding brake lines remains pumping the brake pedal.

As can be seen, there is a need for an improved device for bleeding brake lines with one person.

SUMMARY OF THE INVENTION

In one aspect of the present invention, a brake pedal pumping device comprises a wheel piston adapted to connect to a steering wheel of a vehicle; a middle piston, positioned inside the wheel position, the middle piston adapted to extend from the wheel piston when air pressure is generated inside the wheel piston; and a brake piston, adapted to be connected to a brake pedal of the vehicle, the brake piston adjustably connected to the middle piston.

In another aspect of the present invention, a brake pedal pumping device comprises a wheel piston adapted to connect to a steering wheel of a vehicle; a steering wheel strap connected to an end of the wheel piston, the steering wheel strap forming a loop adapted to extend about the steering wheel; a middle piston, positioned inside the wheel position, the middle piston adapted to extend from the wheel piston when air pressure is generated inside the wheel piston; a brake piston, adapted to be connected to a brake pedal of the vehicle, the brake piston adjustably connected to the middle piston; a brake pedal strap connected to an end of the brake piston, the brake pedal strap forming a loop adapted to extend about the brake pedal; an air coupling adapted to fluidly communicate an interior of the wheel piston with an air hose; and an air valve on the air hose, the air valve adapted to regulate the flow of air into the wheel piston.

These and other features, aspects and advantages of the present invention will become better understood with reference to the following drawings, description and claims.

BRIEF DESCRIPTION OF THE DRAWINGS

FIG. 1 is a perspective view of a pedal pumping device according to an exemplary embodiment of the present invention, in use;

FIG. 2 is a perspective view of the pedal pumping device of FIG. 1;

FIG. 3 is a detail perspective view of one end of the pedal pumping device of FIG. 1;

FIG. 4 is an exploded view of the pedal pumping device of FIG. 1;

FIG. 5 is a detail exploded view of one end of the pedal pumping device of FIG. 1;

FIG. 6 is a detail exploded view of a central region of the pedal pumping device of FIG. 1.

DETAILED DESCRIPTION OF THE INVENTION

Figure 7:
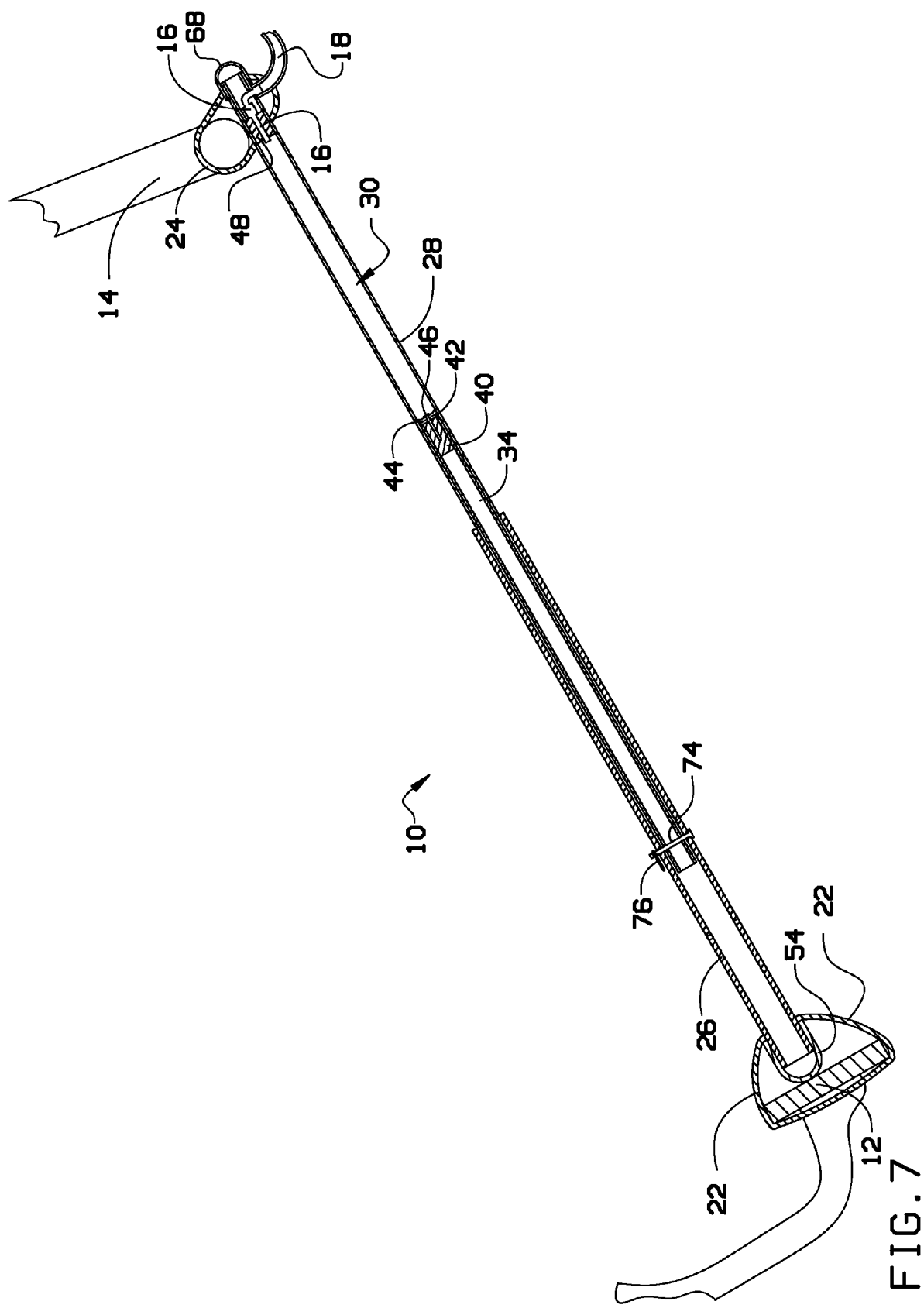
FIG. 7 is a cross-sectional view taken along line 7-7 of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a tool for pumping the brake pedal of a vehicle without requiring a person in the vehicle. The tool permits a person to bleed the hydraulics when doing a brake job without the need for a second person. The tool, also referred to as a pedal pumper, or a pedal pumping device, may include straps on each end for extending the tool between the steering wheel and the brake pedal. When air is supplied to the tool, the air pressure may cause the tool to extend and depress the brake pedal. When the air pressure is released, the force of the tool is released and the brake pedal is allowed to return to its un-depressed position.

Referring now to FIGS. 1 through 7, a brake pedal pumping device 10 may include a wheel piston 28 slidably engagable with a brake piston 26. The wheel piston 28 may be a tubular material having a wheel piston seal block 48 disposed in one end thereof. A wheel piston seal block seal 50 may prevent air from leaking from around the wheel piston seal block 48. An air coupling 16 may be adapted to receive air via an air hose 18 on one end thereof. A coupling stem 66 may extend from the other end of the air coupling 16. The coupling stem 66 may extend through the wheel piston seal block 48 to provide a means for delivering air into the wheel piston 28.

A coupling housing 52 may fit over the end of the wheel piston 28. A coupling housing coupling slot 62 may be cut in the coupling housing 52 to allow the air coupling 16 to fit therein. A coupling housing strap slot 60 may be formed in the end of the coupling housing 52. A wheel piston strap slot 58 may be cut in the wheel piston 28. A steering wheel strap 24 may fit through the coupling housing strap slot 60 and wheel piston strap slot 58. The steering wheel strap 24 may form an adjustable loop with an adjustment mechanism, such as a strap buckle 72, to secure the device 10 to a steering wheel 14 of a vehicle 32. A wheel piston cap 54 may fit over the end of the wheel piston 28 and the coupling housing 52.

A middle piston 34 may fit inside the wheel piston 28, extending into the wheel piston 28 from an end opposite that of the air coupling 16. A leading end 38 of the middle piston 34 may have a middle piston seal block 40 adapted to prevent air from flowing through the middle piston 34. An air seal collar screw 46 may hold a washer 42 and an air seal collar 44 to the middle piston seal block 40. The washer 42 and air seal collar 44 may be designed to restrict air flow past the end of the middle piston 34 such that, when air is delivered into the wheel piston 28 via the air coupling 16, pressure may build up within the wheel piston 28 to push the middle piston 34 away from the air coupling 16 of the wheel piston 28.

The middle piston 34 may include a middle piston pin hole 36. A brake piston 26 may fit over the wheel piston 28 and the middle piston 34. The brake piston 26 may include a plurality of brake piston pin holes 78. A pin, such as a clevis pin 74, for example, may fit through one of the brake piston pin holes 78 and through the middle piston pin hole 36 to secure the brake piston 26 to the middle piston 34. A pin, such as a cotter pin 76 may secure the clevis pin 74 in place in through the desired holes 78, 36. Therefore, when air pressure in the wheel piston 28 pushes the middle piston 34, it, in turn, pushes the brake piston 26. The plurality of brake piston pin holes 78 may permit a length adjustment of the device 10. A brake piston cap 68 may be attached on a distal end of the brake piston 26. A brake strap 22 may be attached to the brake piston cap 68. The brake strap 22 may have an adjustment mechanism, such as a strap buckle 72, for securing the brake strap 22 around a brake pedal 12 of a vehicle.

In use, an operator may open and close the bleeder while depressing the brake pedal via an air valve 20 at the end of the air hose 18. The device 10 may be adjusted to length via the pin holes 78, 36 and pin 74 as described above. The device 10 may then be attached to the steering wheel 14 with the steering wheel strap 24 and the device 10 may be attached to the brake pedal 12 with the brake pedal strap 22. By opening the air valve 20, air pressure may build up inside the wheel piston 28, pushing the middle piston 34 with the air pressure. The middle piston 34, being connected to the brake piston 26, pushes the brake piston 26 against the brake pedal 12. When the valve 20 is closed, the air pressure in the wheel piston 28 dissipates and the brake pedal 12 returns to its un-depressed position. Typically, the air pressure in the wheel piston 28 is relieved through the closed valve 20.

The device of the present invention may be used in other circumstances where pressing and releasing of an object is desired from a distance. The lengths and diameters of the pistons 26, 28, 34 may vary due to their application.

It should be understood, of course, that the foregoing relates to exemplary embodiments of the invention and that modifications may be made without departing from the spirit and scope of the invention as set forth in the following claims.

What is claimed is:

1. A brake pedal pumping device comprising:
    a wheel piston adapted to connect to a steering wheel of a vehicle;
    a middle piston, positioned inside the wheel piston, the middle piston adapted to extend from the wheel piston when air pressure is generated inside the wheel piston;
    a brake piston, adapted to be connected to a brake pedal of the vehicle, the brake piston adjustably connected to the middle piston;
    a plurality of brake piston pin holes in the brake piston;
    a middle piston in hole in the middle piston; and
    a pin adapted to extend through one of the plurality of brake piston pin holes and the middle piston pin holes to provide a length adjustment mechanism for the device.

2. The brake pedal pumping device of claim 1, further comprising an air coupling adapted to fluidly communicate an interior of the wheel piston with an air hose.

3. The brake pedal pumping device of claim 2, further comprising an air valve on the air hose, the air valve adapted to regulate the flow of air into the wheel piston.

4. The brake pedal pumping device of claim 1, further comprising:
    a steering wheel strap connected to an end of the wheel piston, the steering wheel strap forming a loop adapted to extend about the steering wheel; and
    a brake pedal strap connected to an end of the brake piston, the brake pedal strap forming a loop adapted to extend about the brake pedal.

5. The brake pedal pumping device of claim 4, further comprising a strap buckle to adjust the size of the loops in the brake pedal strap and the steering wheel strap.

6. The brake pedal pumping device of claim 1, further comprising a middle piston seal block, a washer, and an air seal collar disposed in one end of the middle piston.

7. A brake pedal pumping device comprising:
    a wheel piston adapted to connect to a steering wheel of a vehicle;
    a steering wheel strap connected to an end of the wheel piston, the steering wheel strap forming a loop adapted to extend about the steering wheel;
    a middle piston, positioned inside the wheel piston, the middle piston adapted to extend from the wheel piston when air pressure is generated inside the wheel piston;
    a brake piston, adapted to be connected to a brake pedal of the vehicle, the brake piston adjustably connected to the middle piston;
    a plurality of brake piston pin holes in the brake piston;
    a middle piston pin hole in the middle piston;
    a pin adapted to extend through one of the plurality of brake piston pin holes and the middle piston pin holes to provide a length adjustment mechanism for the device;
    a brake pedal strap connected to an end of the brake piston, the brake pedal strap forming a loop adapted to extend about the brake pedal;
    an air coupling adapted to fluidly communicate an interior of the wheel piston with an air hose; and
    an air valve on the air hose, the air valve adapted to regulate the flow of air into the wheel piston.

8. The brake pedal pumping device of claim 7, further comprising a strap buckle to adjust the size of the loops in the brake pedal strap and the steering wheel strap.

9. A brake pedal pumping device comprising:
    a wheel piston adapted to connect to a steering wheel of a vehicle;
    an air coupling adapted to fluidly communicate an interior of the wheel piston with an air hose;
    a middle piston, positioned inside the wheel piston, the middle piston adapted to extend from the wheel piston when air pressure is generated inside the wheel piston; and
    a brake piston, adapted to be connected to a brake pedal of the vehicle, the brake piston adjustably connected to the middle piston.

10. The brake pedal pumping device of claim 9, further comprising an air valve on the air hose, the air valve adapted to regulate the flow of air into the wheel piston.

11. The brake pedal pumping device of claim 9, further comprising:
    a steering wheel strap connected to an end of the wheel piston, the steering wheel strap forming a loop adapted to extend about the steering wheel; and
    a brake pedal strap connected to an end of the brake piston, the brake pedal strap forming a loop adapted to extend about the brake pedal.

* * * * *